United States Patent
Huang et al.

(10) Patent No.: US 9,997,911 B2
(45) Date of Patent: Jun. 12, 2018

(54) GENERATING ELECTRIC SUBSTATION LOAD TRANSFER CONTROL PARAMETERS

(71) Applicant: Utopus Insights, Inc., Valhalla, NY (US)

(72) Inventors: Zhen Huang, Beijing (CN); Feng Jin, Shanghai (CN); Qi Ming Tian, Beijing (CN); Wen Jun Yin, Beijing (CN); Ya Nan Zhang, Shanghai (CN); Ming Zhao, Beijing (CN)

(73) Assignee: Utopus Insights, Inc., Valhalla, NY (US)

( * ) Notice: Subject to any disclaimer, the term of this patent is extended or adjusted under 35 U.S.C. 154(b) by 671 days.

(21) Appl. No.: 14/601,554

(22) Filed: Jan. 21, 2015

(65) Prior Publication Data

US 2015/0212534 A1 Jul. 30, 2015

(30) Foreign Application Priority Data

Jan. 24, 2014 (CN) .......................... 2014 1 0034931

(51) Int. Cl.
*H02J 3/00* (2006.01)
*G05F 1/66* (2006.01)
(Continued)

(52) U.S. Cl.
CPC .................. *H02J 3/00* (2013.01); *G05F 1/66* (2013.01); *G06F 17/16* (2013.01); *G06Q 10/04* (2013.01); *G06Q 50/06* (2013.01); *Y04S 10/60* (2013.01)

(58) Field of Classification Search
None
See application file for complete search history.

(56) References Cited

U.S. PATENT DOCUMENTS 7,893,563 B2  2/2011  Ghafurian et al.
8,121,740 B2  2/2012  Yang et al.
(Continued)

FOREIGN PATENT DOCUMENTS

CN  102074956 B  5/2013
WO  2012163187 A1  12/2012

OTHER PUBLICATIONS

List of IBM Patents or Patent Applications Treated as Related; Date Filed: Jan. 21, 2015, pp. 1-2.
(Continued)

*Primary Examiner* — Tuan Dao
(74) *Attorney, Agent, or Firm* — Sheppard, Mullin, Richter & Hampton, LLP

(57) ABSTRACT

A method for generating electric substation load transfer control parameters includes adjusting elements in a fundamental scale matrix according to a condition change of a power grid, wherein the fundamental scale matrix is constructed based on the topology structure of the power grid, and the elements in the fundamental scale matrix represent switch information and risk values of paths between nodes of the power grid, wherein the switch information represents number of switching times required for connecting two nodes of the power grid; and performing operations on the adjusted fundamental scale matrix to generate switch information and risk values of paths for electric substation load transfer control, as electric substation load transfer control parameters.

8 Claims, 6 Drawing Sheets

(51) Int. Cl.
   *G06F 17/16* (2006.01)
   *G06Q 50/06* (2012.01)
   *G06Q 10/04* (2012.01)

(56) References Cited

U.S. PATENT DOCUMENTS

| | | | |
|---|---|---|---|
| 2002/0112212 A1* | 8/2002 | Cohn | G06F 17/5036 716/112 |
| 2003/0167265 A1* | 9/2003 | Corynen | G06Q 10/04 |
| 2004/0204854 A1 | 10/2004 | Murphy | |
| 2008/0288118 A1 | 11/2008 | Solo et al. | |
| 2010/0217577 A1 | 8/2010 | Korobkov | |
| 2011/0288692 A1* | 11/2011 | Scott | G06F 21/55 700/297 |
| 2011/0320058 A1 | 12/2011 | Rietmann et al. | |
| 2012/0059532 A1* | 3/2012 | Reifenhauser | H02J 3/00 700/297 |
| 2012/0317058 A1 | 12/2012 | Abhulimen | |
| 2012/0324273 A1 | 12/2012 | Shaffer | |
| 2013/0070754 A1 | 3/2013 | Lovanna | |

OTHER PUBLICATIONS

Zhen Huang, et al.," Generating Electronic Substation Load Transfer Control Parameters," U.S. Appl. No. 14/746,880, filed Jun. 23, 2015.

W. Huang, et al., "Optimal Planning of a Load Transfer Substation Pair Between Two Normally Closed-loop Feeders Considering Minimization of System Power Losses Using a Genetic Algorithm," IEEE Fourth International Conference on Genetic and Evolutionary Computing, Dec. 2010, pp. 453-456.

M. Romero, et al., "Optimal Switch Allocation for Automatic Load Transfer in Distribution Substations," IEEE Trondheim PowerTech, Jun. 19-23, 2011, pp. 1-7.

\* cited by examiner

GENERATING ELECTRIC SUBSTATION LOAD TRANSFER CONTROL PARAMETERS

FOREIGN PRIORITY

This application claims priority to Chinese Patent Application No. 201410034931.3, filed Jan. 24, 2014, and all the benefits accruing therefrom under 35 U.S.C. § 119, the contents of which in its entirety are herein incorporated by reference.

BACKGROUND

The present invention relates generally to electric substation load transfer control, and more specifically, to a method for generating electric substation load transfer control parameters, a device for generating electric substation load transfer control parameters, and an electric substation load transfer control system.

Power supply reliability of electric power grids is one of the important aspects of daily life and normal business operation. However, there are a lot of outages that occur on a daily basis for main substations due to, for example, routine maintenance of the substations, accident examinations, repairs and so on. Outages may generally result in large-area blackouts or even large-area power cut accidents. Therefore, for the requirement of maintenance without blackout, it is required to switch the load of an outage electric substation to other substation. In this case, the load transfer strategy applied between electric substations will become critical. A substation load transfer strategy involves the determination of an optimal load transfer path, which means minimizing security risk (including transfer risk and operation risk). This requires meeting with a criterion of minimized load transfer risk.

In the prior art, transfer paths and their risks are analyzed manually. Manual analysis may be only performed for specific load or a transfer task for a specific electric substation. Once the transfer task is changed, it must be re-analyzed manually. Further, in the prior art, it is unable to process multiple load transfer tasks simultaneously. Also, in the design of load transfer control parameters, it is very difficult to take path risk (i.e., transfer risk) and switch risk (i.e., operation risk) into account at the same time. Further, for solutions in the prior art, power flow reverse examination is a very difficult task. Further, because power grids are generally on large scale and complicated, it is difficult to effectively provide parameters for transfer control unless the above factors are considered in an effective and comprehensive manner.

There is not a method provided in the prior art, which may effectively provide parameters for substation load transfer control.

SUMMARY

According to a first aspect of the present invention, there is provided a method for generating electric substation load transfer control parameters, comprising: adjusting elements in a fundamental scale matrix according to a condition change of a power grid, wherein the fundamental scale matrix is constructed based on the topology structure of the power grid, and the elements in the fundamental scale matrix represent switch information and risk values of paths between nodes of the power grid, wherein the switch information represents number of switching times required for connecting two nodes of the power grid; and performing operations on the adjusted fundamental scale matrix to generate switch information and risk values of paths for electric substation load transfer control, which are used as electric substation load transfer control parameters.

According to a second aspect of the present invention, there is provided a device for generating electric substation load transfer control parameters, comprising: an adjustment unit, configured to adjust elements in a fundamental scale matrix according to a condition change of a power grid, wherein the fundamental scale matrix is constructed based on the topology structure of the power grid, and the elements in the fundamental scale matrix represent switch information and risk values of paths between nodes of the power grid, wherein the switch information represents number of switching times required for connecting two nodes of the power grid; and an operation unit, configured to perform operations on the adjusted fundamental scale matrix to generate switch information and risk values of paths for electric substation load transfer control, which are used as electric substation load transfer control parameters.

According to a third aspect of the present invention, there is provided an electric substation load transfer control system, comprising the device for generating electric substation load transfer control parameters according to the present invention, and a transfer control device configured to control transfer operations in the power grid according to the switch information and risk values of paths generated by the device for generating electric substation load transfer control parameters.

Compared with the prior art, through generating electric substation load transfer control parameters based on a fundamental scale matrix, computational complexity may be reduced in the present invention. Further, because electric substation load transfer control parameters are provided by using a matrix, the present invention may provide more comprehensive information about various transfer schemes. Further, because the fundamental scale matrix comprises switch information and path risk values, switch risk and path risk may be taken into account at the same time during the process.

Other features and advantages of the present invention will become more apparent when reading the following detailed description of embodiments of the present invention with reference to drawings.

BRIEF DESCRIPTION OF THE DRAWINGS

The accompanying drawings, which are incorporated into the description and are part of the description, show embodiments of the present invention, which are used to explain the principle of the present invention along with the description.

DETAILED DESCRIPTION

Figure 1:
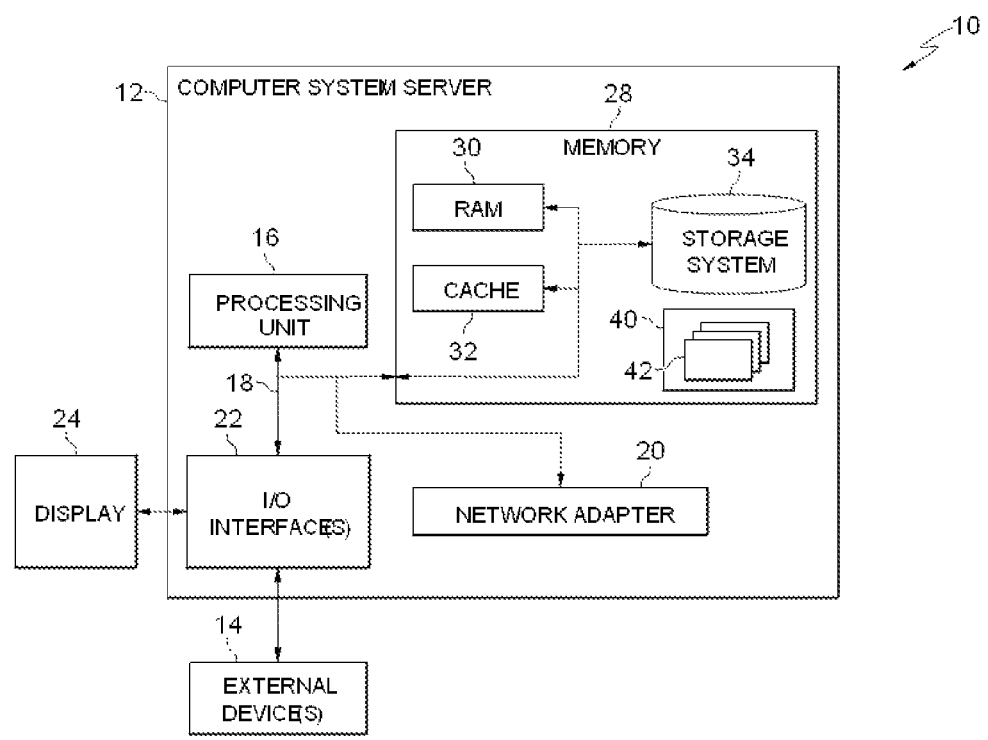
FIG. 1 shows an exemplary computer system/server which is applicable to implement the embodiments of the present invention.

Disclosed herein is a novel approach for generating electric substation load transfer control parameters. Exemplary embodiments will be described in more detail with reference to the accompanying drawings, in which the embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Below, embodiments and examples of this invention will be described with reference to drawings, in which repetitive portions may be omitted.

Figure 2:
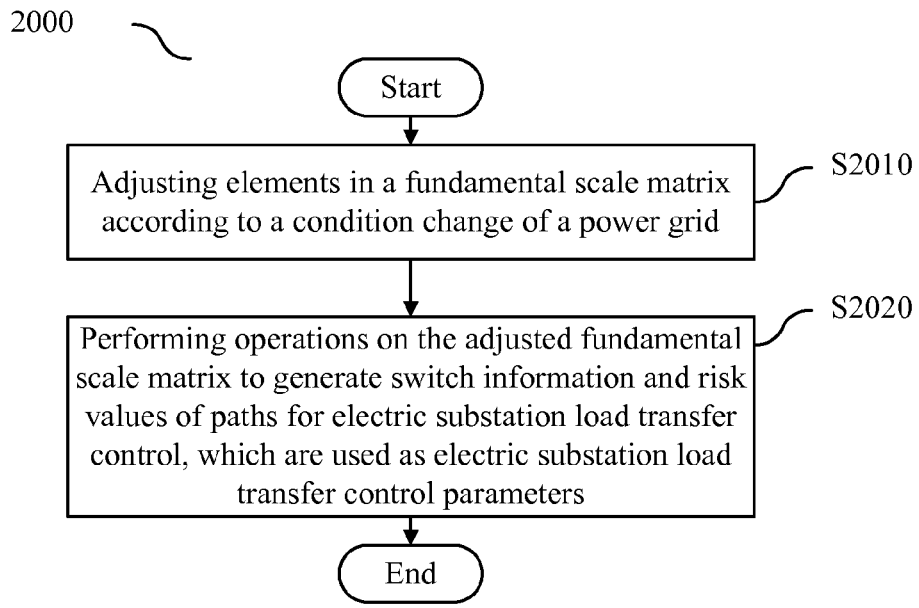
FIG. 2 shows a flowchart of a method for generating electric substation load transfer control parameters according to an embodiment of this invention.

FIG. 2 shows a flowchart of a method 2000 for generating electric substation load transfer control parameters according to an embodiment of this invention.

At step S2010, elements in a fundamental scale matrix are adjusted according to a condition change of a power grid.

The fundamental scale matrix is constructed based on the topology structure of the power grid, and the elements in the fundamental scale matrix represent switch information and risk values of paths between nodes of the power grid. The switch information may represent, for example, number of switching times required for connecting two nodes of the power grid. The risk values may be, for example, empirical values. The risk values may be determined by experts based on their empirical knowledge. For example, at least one of the switch information and risk values of the elements may be adjusted according to a condition change of the power grid.

For example, the fundamental scale matrix may be stored in memory. A processor may be configured with instructions to read the fundamental scale matrix from the memory and to adjust corresponding elements in the fundamental scale matrix when the condition of the power grid changes. For example, if an outage occurs on a path of the power grid, a risk value of an element corresponding to the path in the fundamental scale matrix is modified to 0.

For example, the processor may be configured with instructions to store the adjusted fundamental scale matrix into the original memory or to store the adjusted fundamental scale matrix into a cache memory for processing.

At step S2020, operations are performed on the adjusted fundamental scale matrix to generate switch information and risk values of paths used for electric substation load transfer control, which are used as electric substation load transfer control parameters. The switch information and risk values of paths may be used as electric substation load transfer control parameters.

For example, the processor may be configured with instructions to read the adjusted fundamental scale matrix from the memory or cache memory and to then perform operations on the fundamental scale matrix.

The fundamental scale matrix may be defined by users as required. Expansion may be made to the fundamental scale matrix by users as needed. For example, the dimensions of the fundamental scale matrix may be simply adjusted by a user to reflect topology structures of different power grids.

Further, depending on different purposes of analysis, a user may select different operations, or a user may define operations by themselves.

In this invention, through maintaining a fundamental scale matrix to provide parameters for electric substation load transfer control, the complexity of data sources may be greatly reduced. Further, because switch information and risk values of paths are contained in the elements of the fundamental scale matrix, switch and risk factors may be considered at the same time in the operation. Further, because a user may self-define and/or expand the fundamental scale matrix, more flexibility may be provided for the user. Further, a matrix may also be resultant from the operation performed on the adjusted fundamental scale matrix. Switch information and risk values of various paths during the operation may be recorded in the resultant matrix at the same time, and thus this invention may provide more comprehensive information for transfer control.

Next, an example of an improvement made on the base of the embodiment of this invention will be described.

According to an example of this invention, the fundamental scale matrix may be re presented by $\vec{M}=(s_{i,j}k_{i,j})_{n\times n}$, wherein n represents the number of nodes in a power grid, $s_{i,j}$ represents switch information of a path from node i to node j in the power grid, and $k_{i,j}$ represents a risk value of a path from node i to node j. Those skilled in the art may conceive a variety of variants to the matrix $\vec{M}$, all of which fall within the scope of protection in this invention so long as these variants may be converted to a matrix $\vec{M}$ and may be used to generate electric substation load transfer control parameters.

For example, in this example, the step of performing operations on the adjusted fundamental scale matrix may comprise: according to a specified order N, performing N−1 scale operations on the adjusted fundamental scale matrix $\vec{M}$, wherein the scale operation is as follows:

$$c_{i,r} = \left( \min \text{risk} \sum_{j=1}^{n} (l_{ij}a_{ij} \times m_{jr}b_{jr}) \right) \text{ provided } \vec{M}_1 = \quad \text{(Equation 1)}$$

$$(l_{i,j}a_{i,j})_{n \times n},$$

$$\vec{M}_2 = (m_{j,r}b_{j,r})_{n \times n} \text{ and } \vec{M}_1 \otimes \vec{M}_2 = (c_{i,r})_{n \times n}$$

wherein, $$\min \text{risk} \sum_{j=1}^{n} (l_{ij}a_{ij} \times m_{jr}b_{jr}) =$$

$$\min_{non-zero} \{|a_{i1}\Theta b_{1r}|, |a_{i2}\Theta b_{2r}|, \ldots , |a_{in}\Theta b_{nr}|\} \text{ under the}$$

condition of $\min\{l_{i1} \times m_{1r}, l_{i2} \times m_{2r}, \ldots , l_{in} \times m_{nr}\}$.

The condition represents a minimum value of $\{|a_{i1} \times b_{1r}|, |a_{i2} \times b_{2r}|, \ldots , |a_{in} \times b_{nr}|\}$ under a minimum number of switching times. $\min_{non-zero} \{|a_{i1}\Theta b_{1r}|, |a_{i2}\Theta b_{2r}|, \ldots , |a_{in}\Theta b_{nr}|\}$ represents the minimum value of $\{|a_{i1}\Theta b_{1r}|, |a_{i2}\Theta b_{2r}|, \ldots , |a_{in}\Theta b_{nr}|\}$ under non-zero values.

$\Theta$ is a specified meta operation. For example, depending on different purposes of analysis, the specified meta operation may be addition or multiplication. For example, when the determined risk values are failure probability values, the meta operation may be addition or multiplication, or when the determined risk values are conditional failure probability values depending on surrounding paths, the meta operation may be multiplication.

Performing operations on the fundamental scale matrix may further comprise: generating switch information and risk values of paths for electric substation load transfer control from the resultant matrix $\vec{M}^I$ obtained from the N−1 scale operations.

For example, the resultant matrix $\vec{M}^I$ itself may be used as parameters for electric substation load transfer control, to provide comprehensive information of various paths (for example, switch information and risk values of all paths). For example, switch information and risk values of paths may be searched in a target row or a target column of the resultant matrix $\vec{M}^I$, as parameters for electric substation load transfer control. For example, paths with a minimum number of switching times may be searched at first, and then a path having a minimum risk value may be selected from the paths with the minimum number of switching times and is used as a transfer path.

In this example, the order N may represent the section number of a path from a node to another node, or (N−1) represents the number of intermediate nodes passed through from a node to another node. Thus, the largest range of N is from 1 to the section number of the longest path in the power grid. Users may specify order N as required. If a user wants to look up transfer states of direct paths, N may be set to 1.

If a user wants to look up transfer states of paths passing through one intermediate node, N may be set to 2, and so on.

According to another example of this invention, the previous example may be partially improved. In this example, the fundamental scale matrix may further base on voltage levels of the power grid. In the fundamental scale matrix, sub-matrixes of various voltage levels are arranged in sequence on the main diagonal of the fundamental scale matrix according to their voltage levels.

In this example, before performing scale operations, the adjusted fundamental scale matrix is scanned to determine and mark elements causing reverse power flow paths. The scanned parts comprise various elements in sub-matrixes above sub-matrixes of various voltage levels in the adjusted fundamental scale matrix.

In this example, the scale operation may be redefined as follows:

$$\min \text{risk} \sum_{j=1}^{n} (l_{ij}a_{ij} \times m_{jr}b_{jr}) = \quad \text{(Equation 2)}$$

$$\min_{non-zero} \{|a_{i1}\Theta b_{1r}|, |a_{i2}\Theta b_{2r}|, \ldots , |a_{in}\Theta b_{nr}|\} \text{ under the}$$

condition $\min\{l_{i1} \times m_{1r}, l_{i2} \times m_{2r}, \ldots , l_{in} \times m_{nr}\}$ and excluding elements marked as causing reverse power flow paths.

In this example, elements marked as causing reverse power flow path are ignored in the scale operations.

In this example, through designing the structure of the fundamental scale matrix, this invention makes a reverse power flow examination easier. Further, elements causing reverse power flow are marked to enable the consideration of reverse power flow in the operations.

Figure 3:
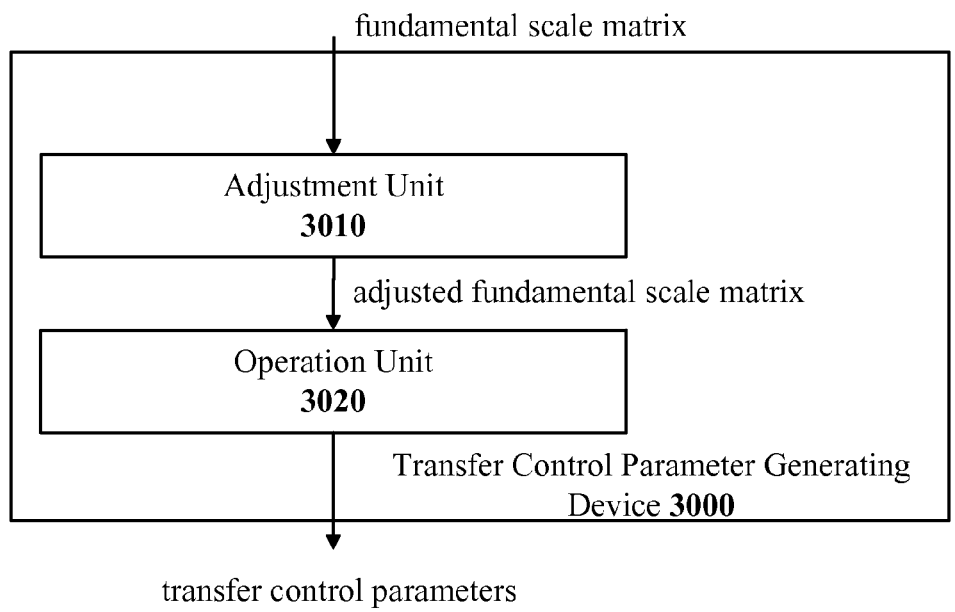
FIG. 3 shows a block diagram of a device for generating electric substation load transfer control parameters according to an embodiment of this invention.

FIG. 3 shows a block diagram of a device 3000 for generating electric substation load transfer control parameters according to an embodiment of this invention.

As shown in FIG. 3, the transfer control parameter generating device 3000 comprises an adjustment unit 3010 and an operation unit 3020.

The adjustment unit 3010 is configured to adjust elements in a fundamental scale matrix according to a condition change of a power grid. The fundamental scale matrix is constructed based on the topology structure of the power grid, and the elements in the fundamental scale matrix represent switch information and risk values of paths between nodes of the power grid. The switch information represents number of switching times required for connecting two nodes of the power grid. The risk values may be, for example, empirical values. For example, the adjustment unit may be configured to adjust at least one of switch information and risk values for the elements according to a condition change of the power grid.

The operation unit 3020 is configured to perform operations on the adjusted fundamental scale matrix to generate switch information and risk values of paths for electric substation load transfer control, which are used as electric substation load transfer control parameters.

Those skilled in the art may understand that the adjustment unit 3010 and the operation unit 3020 may be implemented in various ways. For example, the adjustment unit 3010 and the operation unit 3020 may be realized by configuring a processor with instructions. For example, instructions may be stored in ROM. When a device is booted, instructions may be loaded into a programming device thereof from the ROM to realize the adjustment unit 3010 and the operation unit 3020. For example, the adjustment unit 3010 and the operation unit 3020 may be firmware of a special device.

For example, the adjustment unit 3010 may read the fundamental scale matrix from memory and then adjust the fundamental scale matrix as described above. For example, the adjustment unit 3010 may directly send the adjusted fundamental scale matrix to the operation unit 3020. Or the adjustment unit 3010, for example, may store the adjusted fundamental scale matrix into memory and the operation unit 3020 may read the adjusted fundamental scale matrix from memory later.

In an example according to this invention, the fundamental scale matrix may be represented by $\vec{M}=(s_{i,j}k_{i,j})_{n\times n}$, wherein n represents the number of nodes in a power grid, $s_{i,j}$ represents switch information of a path from node i to node j in the power grid, and $k_{i,j}$ represents a risk value of a path from node i to node j. In this example, the operation unit 3020 may be configured to perform N−1 scale operations on the adjusted fundamental scale matrix $\vec{M}$ according to the specified order N. The scale operation is as follows:

$$c_{i,r} = \left(\min \text{risk} \sum_{j=1}^{n} (l_{ij}a_{ij} \times m_{jr}b_{jr})\right) \text{ provided } \vec{M}_1 = \quad \text{(Equation 3)}$$

$$(l_{i,j}a_{i,j})_{n\times n},$$

$$\vec{M}_2 = (m_{j,r}b_{j,r})_{n\times n} \text{ and } \vec{M}_1 \otimes \vec{M}_2 = (c_{i,r})_{n\times n}$$

wherein, $$\min \text{risk} \sum_{j=1}^{n} (l_{ij}a_{ij} \times m_{jr}b_{jr}) =$$

$$\min_{non-zero}\{|a_{i1}\Theta b_{1r}|, |a_{i2}\Theta b_{2r}|, \ldots, |a_{in}\Theta b_{nr}|\} \text{ under the}$$

condition of $\min\{l_{i1} \times m_{1r}, l_{i2} \times m_{2r}, \ldots, l_{in} \times m_{nr}\}$.

The condition represents a minimum value of $\{|a_{i1}\times b_{1r}|, |a_{i2}\times b_{2r}|, \ldots, |a_{in}\times b_{nr}|\}$ under a minimum number of switching times.

$\Theta$ is a specified meta operation. For example, depending on different purposes of analysis, the specified meta operation may be addition or multiplication.

In this example, switch information and risk values of paths for electric substation load transfer control may be generated from the resultant matrix $\vec{M^I}$ obtained from the N−1 scale operations.

For example, switch information and risk values of paths in a target row or a target column of the resultant matrix $\vec{M^I}$ may be used as parameters for electric substation load transfer control.

For example, the largest range of N may be from 1 to the section number of the longest path in the power grid.

In an example according to this invention, the fundamental scale matrix may further be based on voltage levels of the power grid. In the fundamental scale matrix, sub-matrixes of various voltage levels are arranged in sequence on the main diagonal of the fundamental scale matrix according to their voltage levels.

In this example, the adjustment unit 3010 is further configured to scan various elements in sub-matrixes above sub-matrixes of various voltage levels in the adjusted fundamental scale matrix, so as to determine and mark elements that may cause reverse power flow paths.

In this example, the scale operation may be redefined as follows:

$$\min \text{risk} \sum_{j=1}^{n} (l_{ij}a_{ij} \times m_{jr}b_{jr}) = \quad \text{(Equation 4)}$$

$$\min_{non-zero}\{|a_{i1}\Theta b_{1r}|, |a_{i2}\Theta b_{2r}|, \ldots, |a_{in}\Theta b_{nr}|\} \text{ under the}$$

condition $\min\{l_{i1} \times m_{1r}, l_{i2} \times m_{2r}, \ldots, l_{in} \times m_{nr}\}$ and excluding elements marked as causing reverse power flow paths.

In this example, elements marked as causing reverse power flow paths are ignored in the scale operations.

Figure 4:
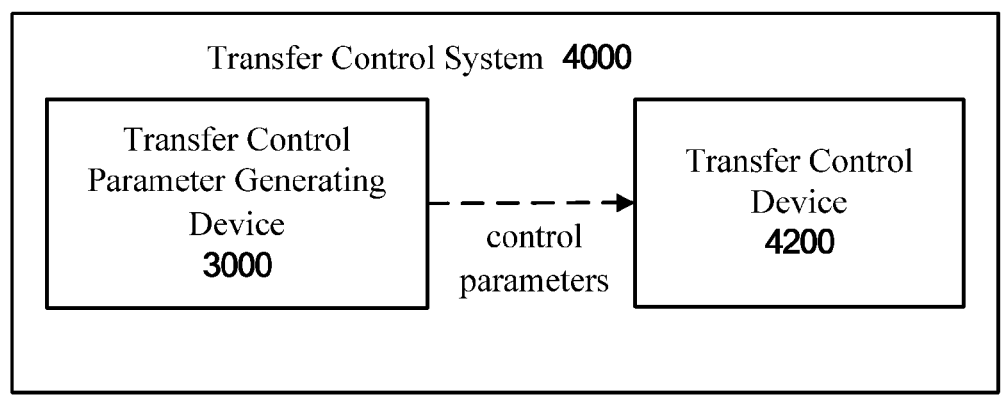
FIG. 4 shows a block diagram of a transfer control system according to an embodiment of this invention.

FIG. 4 shows a block diagram of an electric substation load transfer control system 4000 according to an embodiment of this invention. As shown in FIG. 4, the transfer control system 4000 may comprise a transfer control parameter generating device 3000 and a transfer control device 4200 according to this invention.

The transfer control parameter generating device 3000 generates switch information and risk values of paths for electric substation load transfer control.

For example, based on the switch information and risk values of paths for electric substation load transfer control, the transfer control device 4200 may be manually controlled to perform a transfer operation. For example, the transfer control parameter generating device 3000 may directly send switch information and risk values of paths for electric substation load transfer control to the transfer control device 4200 to automatically perform a transfer operation. For example, the transfer control device 4200 may select a path having the lowest risk value with a minimum number of switching times from the resultant matrix generated by the transfer control parameter generating device 3000, as a transfer path for the transfer control operation.

[Specific Examples]

Figure 5:
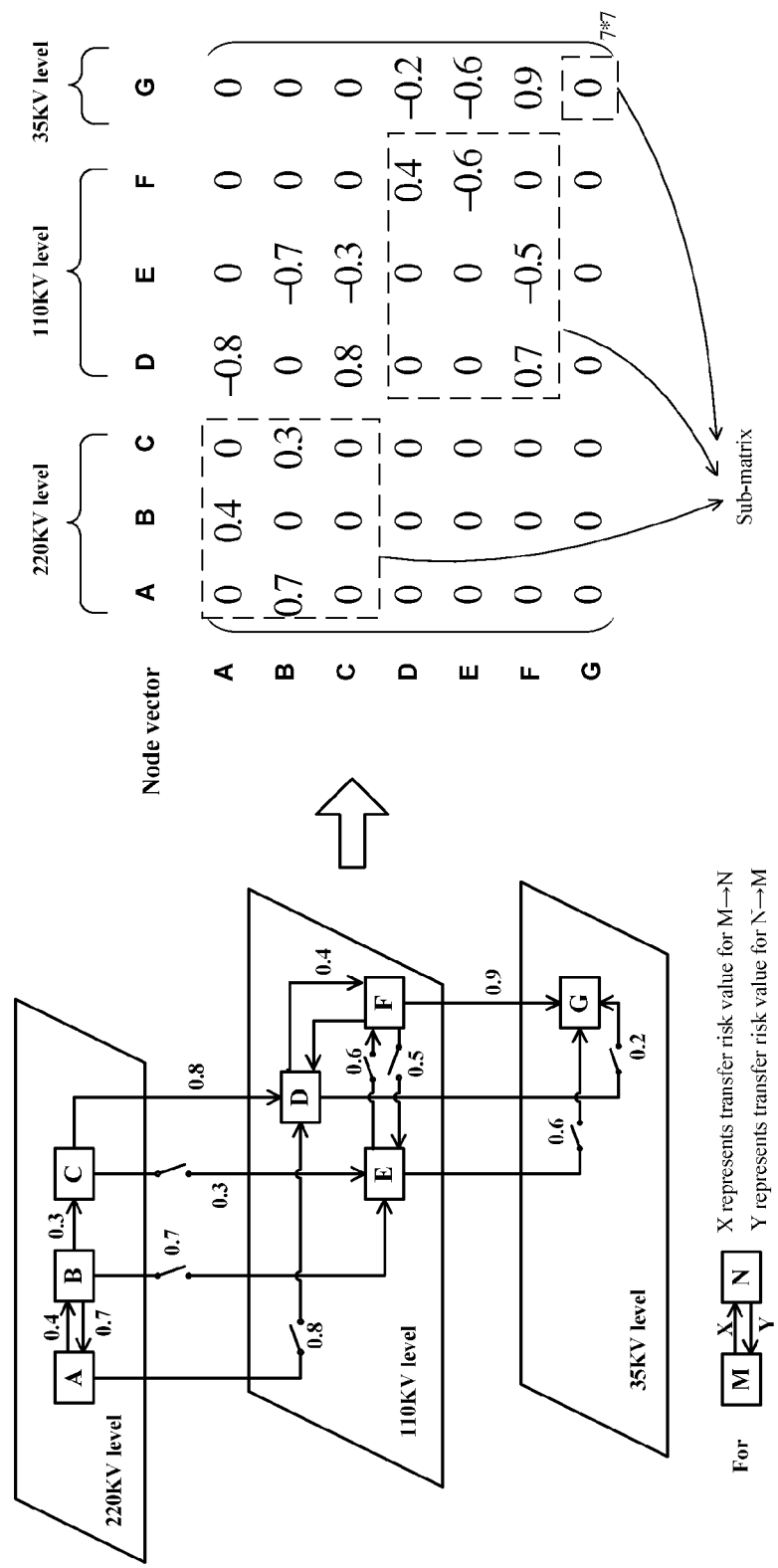
FIG. 5 shows an example of a specific application according to this invention.

FIG. 5 shows an example according to this invention. A power grid shown in FIG. 5 comprises three voltage levels: 220 KV, 110 KV and 35 KV, respectively. There are three 220 KV nodes A, B, C. There are three 110 KV nodes D, E, F. There is one 35 KV node G. FIG. 5 shows paths between various nodes, as well as switch information and risk values of various paths.

A fundamental scale matrix on the right of FIG. 5 may be obtained from the power grid shown in FIG. 5. In this fundamental scale matrix, switch information is represented by "-". One "-" represents one switch operation to be performed. In the fundamental scale matrix, the values represent risk values between two nodes.

The fundamental scale matrix shown in FIG. 5 comprises three sub-matrixes: a 220 KV sub-matrix, a 110 KV sub-matrix and a 35 KV sub-matrix, respectively. These three sub-matrixes are arranged on the main diagonal of the fundamental scale matrix.

The fundamental scale matrix may be stored in memory. Those skilled in the art may understand that the matrix may be stored in many ways. For example, for a sparse matrix, instead of storing all elements in the matrix, it is only required to store some elements of the matrix. For example, various elements in the matrix may be sequentially stored in memory and may be accessed in a two dimensional manner when the matrix is to be read.

Figure 6:
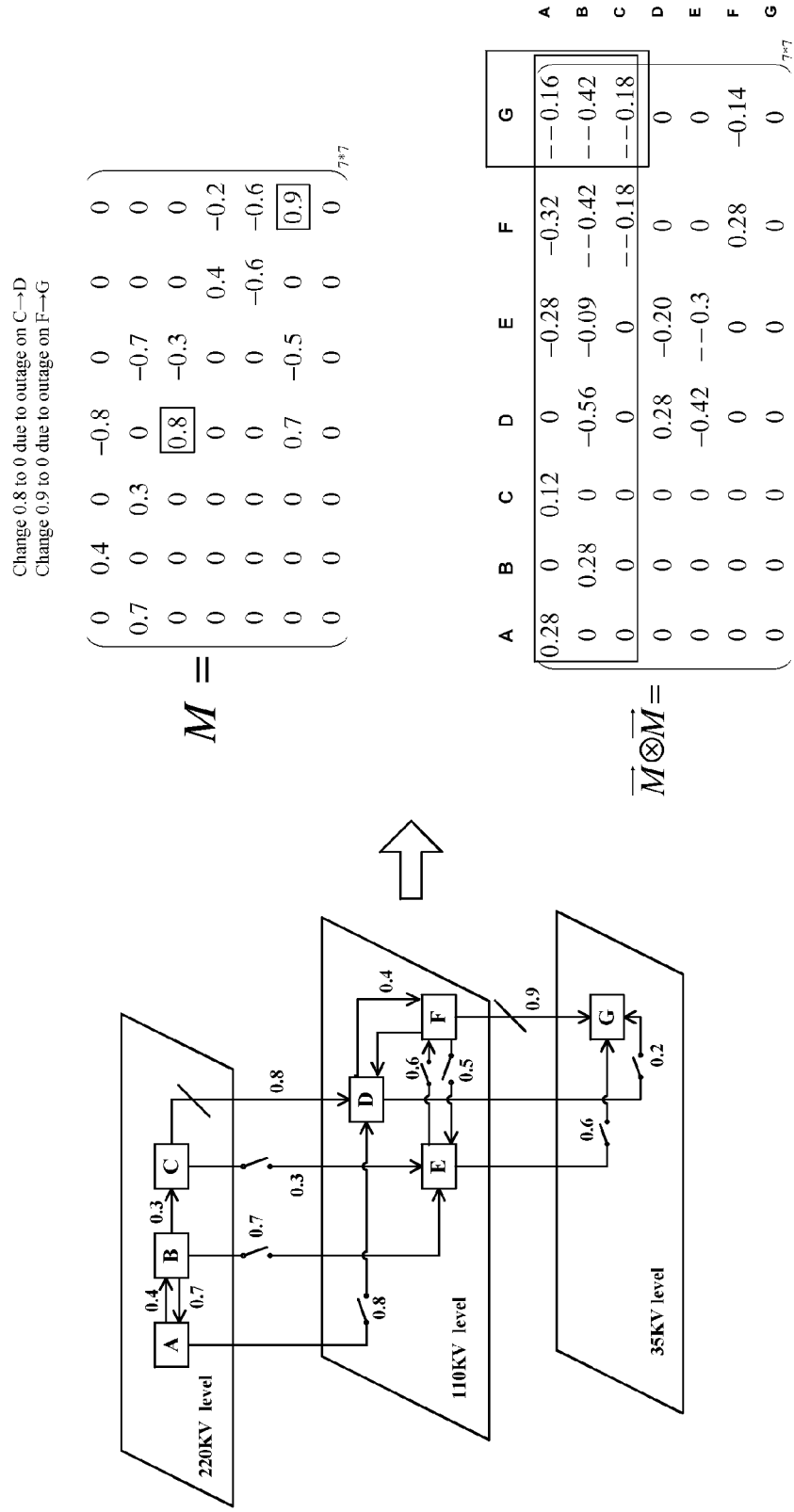
FIG. 6 shows an example of another specific application according to this invention.

As shown in FIG. 6, an outage occurs on a path between node C and node D, and an outage occurs on a path between node F and node G.

Corresponding elements in the fundamental scale matrix may be adjusted by a processor configured with instructions or by a specific device. In the example shown in FIG. 6, risk value 0.8 from C to D is adjusted to 0 and risk value 0.9 from F to G is adjusted to 0.

With a processor configured with instructions or a specific device, a scale operation may be performed on the adjusted fundamental scale matrix $\vec{M}$ according to Equation 1 or 3, to obtain a resultant matrix $\vec{M} \otimes \vec{M}$. The meta operation $\Theta$ in the scale computation is multiplication.

$$\vec{M} \otimes \vec{M} = \begin{pmatrix} 0 & 0.4 & 0 & -0.8 & 0 & 0 & 0 \\ 0.7 & 0 & 0.3 & 0 & -0.7 & 0 & 0 \\ 0 & 0 & 0 & 0 & -0.3 & 0 & 0 \\ 0 & 0 & 0 & 0 & 0 & 0.4 & -0.2 \\ 0 & 0 & 0 & 0 & 0 & -0.6 & -0.6 \\ 0 & 0 & 0 & 0.7 & -0.5 & 0 & 0 \\ 0 & 0 & 0 & 0 & 0 & 0 & 0 \end{pmatrix}_{7*7} \otimes$$

$$\begin{pmatrix} 0 & 0.4 & 0 & -0.8 & 0 & 0 & 0 \\ 0.7 & 0 & 0.3 & 0 & -0.7 & 0 & 0 \\ 0 & 0 & 0 & 0 & -0.3 & 0 & 0 \\ 0 & 0 & 0 & 0 & 0 & 0.4 & -0.2 \\ 0 & 0 & 0 & 0 & 0 & -0.6 & -0.6 \\ 0 & 0 & 0 & 0.7 & -0.5 & 0 & 0 \\ 0 & 0 & 0 & 0 & 0 & 0 & 0 \end{pmatrix}_{7*7} =$$

$$\begin{pmatrix} 0.28 & 0 & 0.12 & 0 & -0.28 & -0.32 & --0.16 \\ 0 & 0.28 & 0 & -0.56 & -0.09 & --0.42 & --0.42 \\ 0 & 0 & 0 & 0 & 0 & --0.18 & --0.18 \\ 0 & 0 & 0 & 0.28 & -0.20 & 0 & 0 \\ 0 & 0 & 0 & -0.42 & --0.3 & 0 & 0 \\ 0 & 0 & 0 & 0 & 0 & 0.28 & -0.14 \\ 0 & 0 & 0 & 0 & 0 & 0 & 0 \end{pmatrix}_{7*7}$$

For example, element $c_{6,7}$ is taken as an example to explain the above operation, wherein $c_{6,7}$=min(0.7×0.2, 0.5× 0.6) under the condition min(-,- -), and thus $c_{6,7}$=-0.14.

In the example shown in FIG. 6, for example, a user wants to look up a transfer path from the 220 KV level to the 35 KV level. As shown in FIG. 6, appropriate paths (and their parameters, including risk values and numbers of switching times, for example) are searched in rows A, B, C and column G (shown by blocks in FIG. 6) of the resultant matrix $\vec{M} \otimes \vec{M}$. It can be obtained through a search performed on matrix blocks of $\vec{M}$ and $\vec{M} \otimes \vec{M}$ that, for outages on the C→D section and the F→G section, all possible load transfer paths are as follows:

A->D->G, with risk value 0.16 and two switch actions (two "-");

B->E->G, with risk value 0.42 and two switch actions (two "-");

C->E->G, with risk value 0.18 and two switch actions (two "-").

For example, switch information and risk values may be directly obtained from $\vec{M} \otimes \vec{M}$. For example, path information may be recorded during the operation, or a corresponding path may be determined according to switch information and risk values.

The user may select to transfer from A to G, or from B to G, or from C to G, as desired.

Figure 7:
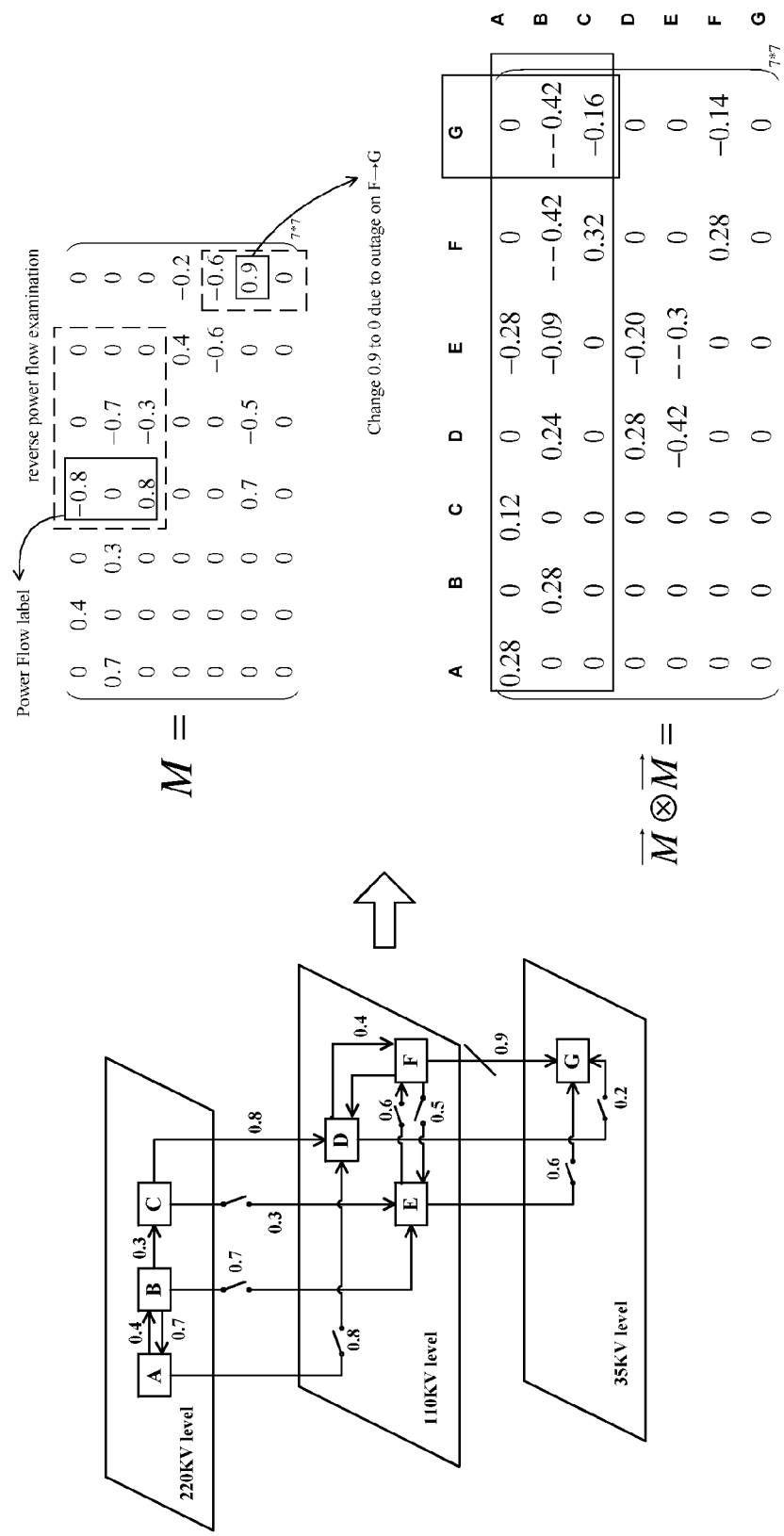
FIG. 7 shows an example of still another specific application according to this invention.

As shown in FIG. 7, an outage occurs on a path between mode F and node G.

Corresponding elements in the fundamental scale matrix may be adjusted by a processor configured with instructions or by a specific device. In the example shown in FIG. 7, risk value 0.9 from F to G is adjusted to 0.

By using a processor configured with instructions or a specific device, a reverse power flow examination may be performed on the adjusted fundamental scale matrix. For example, a reverse power flow examination may be performed on a sub-matrix above the 110 KV sub-matrix (corresponding to nodes D, E, F) and a sub-matrix above the 35 KV sub-matrix (corresponding to node G). It may be found after the examination that there is an element (A→D) causing reverse power flow in the sub-matrix above the 110 KV sub-matrix. This element is marked accordingly.

The adjusted and marked fundamental scale matrix is as follows:

$$\begin{pmatrix} 0 & 0.4 & 0 & -\&0.8 & 0 & 0 & 0 \\ 0.7 & 0 & 0.3 & 0 & -0.7 & 0 & 0 \\ 0 & 0 & 0 & 0.8 & -0.3 & 0 & 0 \\ 0 & 0 & 0 & 0 & 0 & 0.4 & -0.2 \\ 0 & 0 & 0 & 0 & 0 & -0.6 & -0.6 \\ 0 & 0 & 0 & 0.7 & -0.5 & 0 & 0 \\ 0 & 0 & 0 & 0 & 0 & 0 & 0 \end{pmatrix}_{7*7}$$

Wherein, the symbol "&" represents that there is a risk of reverse power flow on the path.

By using a processor configured with instructions or a specific device, a scale computation may be performed on the adjusted fundamental scale matrix $\vec{M}$ according to Equation 2 or 4, to obtain a resultant matrix $\vec{M} \otimes \vec{M}$. The meta operation $\Theta$ in the scale computation is multiplication.

$$\vec{M} \otimes \vec{M} = \begin{pmatrix} 0 & 0.4 & 0 & -\&0.8 & 0 & 0 & 0 \\ 0.7 & 0 & 0.3 & 0 & -0.7 & 0 & 0 \\ 0 & 0 & 0 & 0.8 & -0.3 & 0 & 0 \\ 0 & 0 & 0 & 0 & 0 & 0.4 & -0.2 \\ 0 & 0 & 0 & 0 & 0 & -0.6 & -0.6 \\ 0 & 0 & 0 & 0.7 & -0.5 & 0 & 0 \\ 0 & 0 & 0 & 0 & 0 & 0 & 0 \end{pmatrix}_{7*7} \otimes$$

$$\begin{pmatrix} 0 & 0.4 & 0 & -\&0.8 & 0 & 0 & 0 \\ 0.7 & 0 & 0.3 & 0 & -0.7 & 0 & 0 \\ 0 & 0 & 0 & 0.8 & -0.3 & 0 & 0 \\ 0 & 0 & 0 & 0 & 0 & 0.4 & -0.2 \\ 0 & 0 & 0 & 0 & 0 & -0.6 & -0.6 \\ 0 & 0 & 0 & 0.7 & -0.5 & 0 & 0 \\ 0 & 0 & 0 & 0 & 0 & 0 & 0 \end{pmatrix}_{7*7} =$$

-continued $$\begin{pmatrix} 0.28 & 0 & 0.12 & 0 & -0.28 & 0 & 0 \\ 0 & 0.28 & 0 & 0.24 & -0.09 & --0.42 & --0.42 \\ 0 & 0 & 0 & 0 & 0 & 0.32 & --0.16 \\ 0 & 0 & 0 & 0.28 & -0.20 & 0 & 0 \\ 0 & 0 & 0 & -0.42 & --0.3 & 0 & 0 \\ 0 & 0 & 0 & 0 & 0 & 0.28 & -0.14 \\ 0 & 0 & 0 & 0 & 0 & 0 & 0 \end{pmatrix}_{7*7}$$

For example, element $c_{1,7}$ may be taken as an example to explain the above computation, wherein $c_{1,7}=\min(0.8\times0.2)$ under the condition $\min(- -)$ and without elements marked as causing a reverse power flow path (element "–&0.8" indicates the presence of a reverse power flow path and is ignored), and thus $c_{1,7}=0$.

In the example shown in FIG. 7, for example, a user wants to look up a transfer path from the 220 KV level to the 35 KV level. As shown in FIG. 7, appropriate paths (and their parameters, including risk values and numbers of switching times, for example) are searched in rows A, B, C and column G (shown by blocks in FIG. 7) of the resultant matrix $\vec{M} \otimes \vec{M}$. It can be obtained through a search performed on matrix blocks of $\vec{M}$ and $\vec{M} \otimes \vec{M}$ that, for the outage on the F→G section, all possible load transfer paths are as follows:

B->E->G, with risk value 0.42 and two switch actions (two "-");
C->D->G, with risk value 0.16 and one switch actions (one "-").

For example, switch information and risk values may be directly obtained from $\vec{M} \otimes \vec{M}$. For example, path information may be recorded during the computation, or a corresponding path may be determined according to switch information and risk values.

The user may select to transfer from B to G or from C to G as desired.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A device, comprising a processor and a computer readable medium to store computer program instructions that, when executed by the processor, cause the device to perform a method, the method comprising:
    adjusting, by an adjustment unit, elements in a fundamental scale matrix according to a condition change of a power grid, wherein the fundamental scale matrix is constructed based on a topology structure of the power grid, and the elements in the fundamental scale matrix represent switch information and risk values of paths between nodes of the power grid, wherein the switch information represents a number of switching times required for connecting two nodes of the power grid, wherein the fundamental scale matrix is represented by $\vec{M}=(s_{i,j}k_{i,j})_{n\times n}$, wherein n represents a number of nodes in the power grid, $s_{i,j}$ represents switch information of a path from node i to node j in the power grid, and $k_{i,j}$ represents a risk value of a path from node i to node j, wherein each of i and j is a whole number from 1 to n;
    performing, by an operation unit, operations on the adjusted fundamental scale matrix to generate switch information and risk values of paths for electric substation load transfer control, which are used as electric substation load transfer control parameters; and
    according to a specified order N, performing, by the operation unit, an N–1 scale operations on the adjusted fundamental scale matrix $\vec{M}$, wherein the scale operation is as follows:

$$c_{i,r} = \left( \min \text{risk} \sum_{j=1}^{n} (l_{ij}a_{ij} \times m_{jr}b_{jr}) \right)$$

provided $\vec{M}_1=(l_{ij}a_{i,j})_{n\times n}$, $\vec{M}_2=(m_{j,r}b_{j,r})_{n\times n}$ and $\vec{M}_1 \otimes \vec{M}_2=(c_{i,r})_{n\times n}$ wherein, min risk $\Sigma_{j=1}^{n}(l_{ij}a_{ij}\times m_{jr}b_{jr})=\min_{non-zero}\{|a_{i1}\Theta b_{1,r}|, |a_{i2}\Theta b_{2,r}|, \ldots |a_{in}\Theta b_{nr}|\}$ under the condition of $\min\{l_{ii}\times m_{1r}, l_{12}\times m_{2r}, \ldots, l_{in}\times m_{nr}\}$, representing a minimum value of $\{|a_{i1}\times b_{1,r}|, |a_{i2}\times b_{2,r}|, \ldots |a_{in}\times b_{nr}|\}$ under a minimum number of switching times; $\Theta$ is a specified meta operation, wherein the switch information and risk values of paths for electric substation load transfer control are generated from a resultant matrix $\vec{M^l}$ obtained from the N–1 scale operations.

2. The device according to claim 1, wherein in the fundamental scale matrix, sub-matrixes of various voltage levels are arranged in sequence on a main diagonal of the fundamental scale matrix according to their voltage levels, and wherein the adjustment unit is further configured to scan various elements in sub-matrixes above the sub-matrixes of various voltage levels in the adjusted fundamental scale matrix to determine and mark elements causing reverse power flow paths;
    wherein the elements marked as causing reverse power flow paths are ignored in the N-1 scale operations.

3. The device according to claim 1, wherein switch information and risk values of paths in a target row and a target column of the resultant matrix $\vec{M}^I$ are used as the electric substation load transfer control parameters.

4. The device according to claim 1, wherein the adjustment unit is configured to adjust at least one of the switch information and risk values of the elements according to the condition change of the power grid.

5. An electric substation load transfer control system, comprising:
   at least one processor,
   a control parameter generator configured to utilize the at least one processor to generate electric substation load transfer control parameters, including an adjustment unit, configured to adjust elements in a fundamental scale matrix according to a condition change of a power grid, wherein the fundamental scale matrix is constructed based on a topology structure of the power grid, and the elements in the fundamental scale matrix represent switch information and risk values of paths between nodes of the power grid, wherein the fundamental scale matrix is represented by $\vec{M}=(s_{i,j}k_{i,j})_{n\times n}$, wherein n represents a number of nodes in the power grid, $s_{i,j}$ represents switch information of a path from node i to node j in the power grid, and $k_{i,j}$ represents a risk value of a path from node i to node j, wherein each of i and j is a whole number from 1 to n, wherein the switch information represents a number of switching times required for connecting two nodes of the power grid, and an operation unit configured to perform operations on the adjusted fundamental scale matrix to generate switch information and risk values of paths for electric substation load transfer control, which are used as the electric substation load transfer control parameters and perform N−1 scale operations according to a specified order N on the adjusted fundamental scale $\vec{M}$, wherein the scale operation is as follows $$c_{i,r} = \left( \min \text{risk} \sum_{j=1}^{n} (l_{ij}a_{ij} \times m_{jr}b_{jr}) \right)$$

provided $\vec{M}_1=(l_{i,j}a_{i,j})_{n\times n}$, $\vec{M}_2=(m_{j,r}b_{j,r})_{n\times n}$ and $\vec{M}_1 \otimes \vec{M}_2=(c_{i,r})_{n\times n}$ wherein, min risk $\Sigma_{j=1}^{n}(l_{ij}a_{ij}\times m_{jr}b_{jr})=\min_{non\text{-}zero}\{|a_{i1}\Theta b_{1r}|, |a_{i2}\Theta b_{2r}|, \ldots, |a_{in}\Theta b_{nr}|\}$ under the condition of $\min\{l_{i1}\times m_{1r}, l_{12}\times m_{2r}, \ldots, l_{in}\times m_{nr}\}$, representing a minimum value of $\{|a_{i1}\times b_{1r}|, |a_{12}\times b_{2r}|, \ldots, |a_{in}\times b_{nr}|\}$ under a minimum number of switching times; and $\Theta$ is a specified meta operation, wherein the switch information and risk values of paths for electric substation load transfer control are generated from a resultant matrix $\vec{M}^I$ obtained from the N−1 scale operations; and a transfer control device configured to utilize the at least one processor to control transfer operations in the power grid according to the switch information and risk values of paths generated by the device for generating the electric substation load transfer control parameters.

6. The system according to claim 5, wherein in the fundamental scale matrix, sub-matrixes of various voltage levels are arranged in sequence on a main diagonal of the fundamental scale matrix according to their voltage levels, and wherein the adjustment unit is further configured to scan various elements in sub-matrixes above the sub-matrixes of various voltage levels in the adjusted fundamental scale matrix to determine and mark elements causing reverse power flow paths;
   wherein the elements marked as causing reverse power flow paths are ignored in the N-1 scale operations.

7. The system according to claim 5, wherein switch information and risk values of paths in a target row and a target column of the resultant matrix $\vec{M}^I$ are used as the electric substation load transfer control parameters.

8. The system according to claim 5, wherein the adjustment unit is configured to adjust at least one of the switch information and risk values of the elements according to the condition change of the power grid.

* * * * *